Dec. 31, 1935.   D. A. WHITE ET AL   2,026,079
DEVICE FOR TESTING THERMOSTATS
Filed March 27, 1933   2 Sheets-Sheet 2

INVENTORS
DANIEL A. WHITE
JOHN O. McNAMARA
By *Paul, Paul & Moore*
ATTORNEYS

UNITED STATES PATENT OFFICE 2,026,079

DEVICE FOR TESTING THERMOSTATS

Daniel A. White and John O. McNamara, Minneapolis, Minn.

Application March 27, 1933, Serial No. 663,094

12 Claims. (Cl. 73—51)

This invention relates to improvements in means for testing one or more thermostats of the type used for controlling refrigerating apparatus (to be sure that the contacts open or close at or sufficiently near the temperatures for which they are designed) and includes means for visually and/or audibly signaling to the operator that the test for any particular thermostat is completed, so that he may note the temperature at which this takes place and check it against the rating of the particular thermostat.

Many thermostats of this type are used in domestic refrigerating plants and the present invention grows out of a need for testing them. When something goes wrong with a refrigerating plant, for example a domestic plant, a trouble man is sent for, and generally spends considerable time testing the thermostatic control to see just what is the matter. This is a time-consuming operation and the owners generally register an objection when they get their bill. In any event, if the test shows that the thermostat is defective, it is returned to the company who made it, and is repaired or a new one is sent to replace it.

Thermostats of different companies are of different types and have different ratings conformably to the type of refrigerating apparatus with which they are used. Some open or close at higher or lower temperatures than others. Therefore, if a thermostat is rated to open or close at a certain temperature, and when this rating is known tests can be carried out to see whether it does or does not open or close at the rated temperature.

The present device provides means whereby any number of thermostats can be tested at the same time, whatever their type, and if they have different rates or designed to open or close at different temperatures, each can independently operate its own audible and/or visible signal to indicate that it has been opened or closed. Having heard the signal the attendant notes the temperature at which opening or closing takes place and compares it with the temperature rating for that thermometer.

Figure 1:
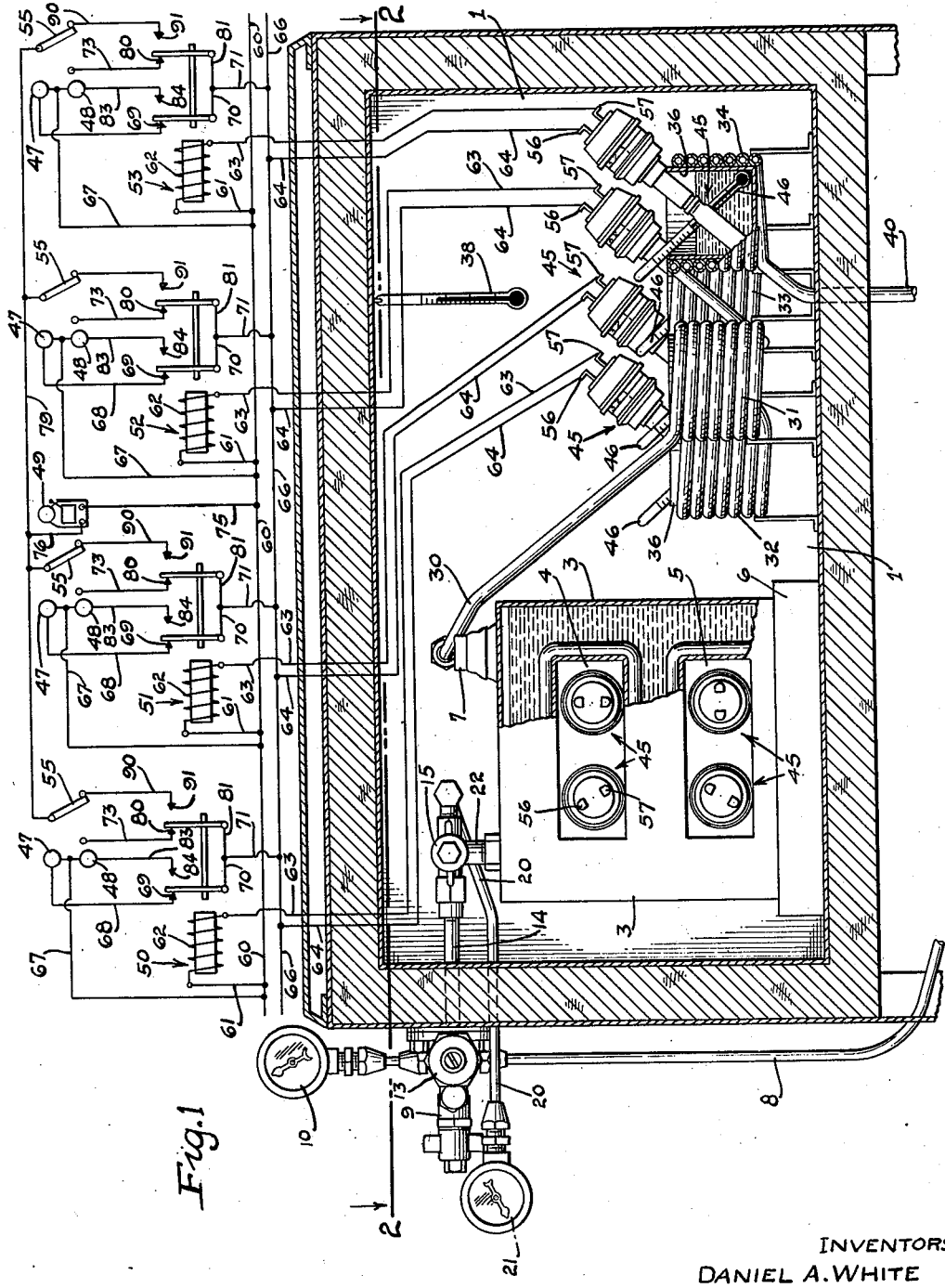
Figure 2:
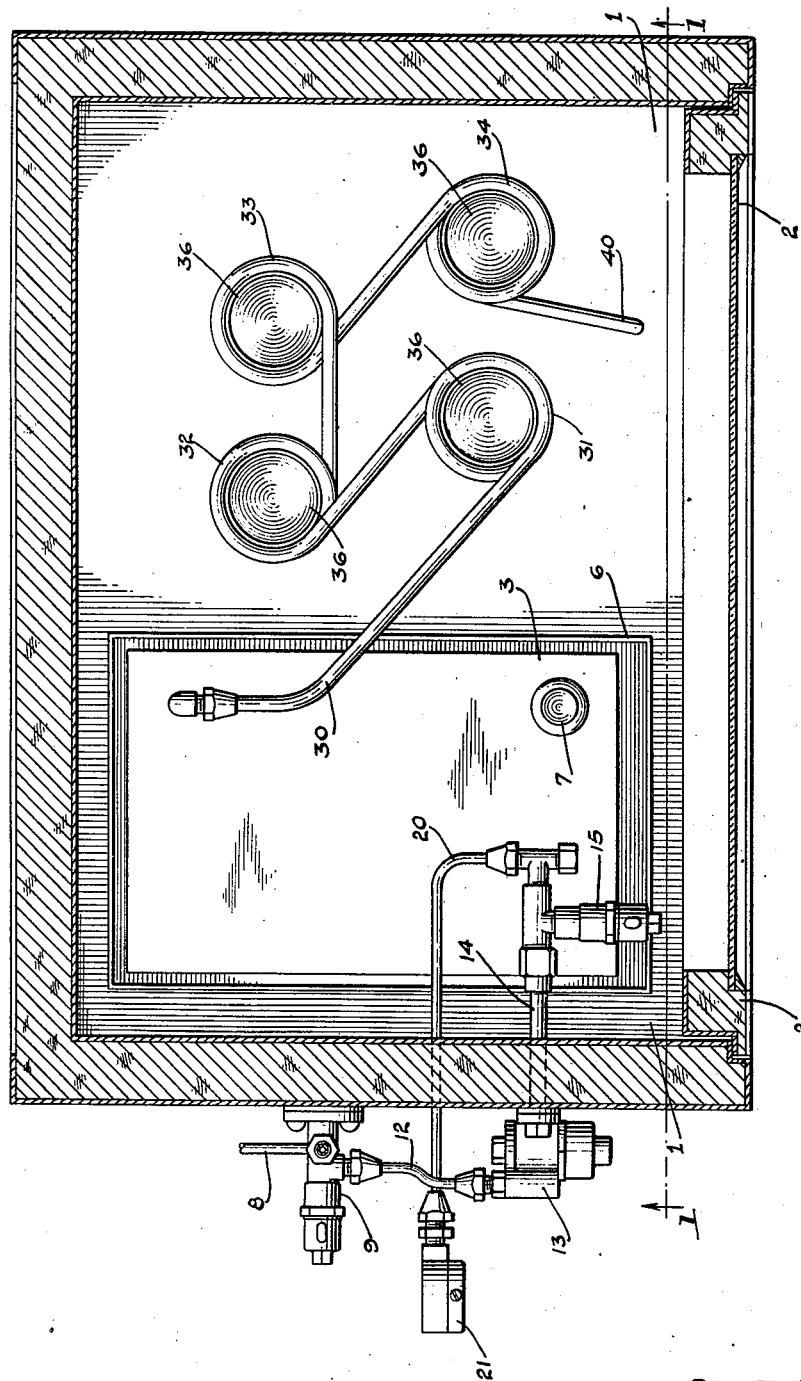

Objects, features and advantages of the invention will be set forth in the description of the drawings forming a part of this application, and in said drawings Figure 1 is a vertical section through a refrigerating chamber on line 1—1 of Fig. 2 illustrating one embodiment of the invention, with the electric signaling means diagrammatically illustrated; and Figure 2 is a plan section on line 2—2 of Figure 1.

In the drawings, a suitable structure provides a refrigeration chamber 1, in which temperature conditions are produced which are similar to those of the refrigerating chambers in which the thermostats to be tested are used. Of course, the walls of the chamber are properly insulated and a door 2 is provided having a glass window permitting the interior to be inspected during the testing period, so that the test temperatures can be noted.

Arranged within the chamber 1 is a refrigerating unit including a casing 3 providing a brine tank, the casing being traversed by open end boxings which sealingly engage with the opposite walls of the casing 3 to provide pre-cooling chambers 4—5 for thermostats which are to be tested for closing. In order to speed up the operation where it is necessary to test a large number of thermostats, the thermostats which are to be tested for closing can be inserted in the brine tank pre-cooling chambers 4—5 to cool them sufficiently to cause their contacts to open. The casing 3 is supported in a drip pan 6, for collecting water during the defrosting period of the unit. The compressor and associated mechanism for causing refrigeration effects in the unit has not been herein illustrated because it is well known in the art and no inventive skill is required to connect it with the refrigeration lines shown. The machine represented uses sulphur dioxide as a refrigerant. The casing 3 is, of course, filled with brine. The capped filling opening is generally indicated at 7.

The pressure side of the refrigeration pipe line is indicated at 8, see Figure 1, and this leads to a valve device adapted to facilitate the testing of the expansion valve 13 to see that it is in working order which latter valve is connected to the valve 9 by the pipe 12, see Figure 2. The expansion valve 13 is connected by piping 14 to another testing valve 15, and to the casing of the valve 15 is connected the pipe 20 leading to a pressure gauge 21. The valve 9 is provided with pressure gauge 10, see Figure 1. Testing is accomplished by the adjusting screw of the expansion valve, which screw is shown at the center of the element to which the numeral 13 is applied.

The present invention is in part concerned with the arrangement and/or modification of the low pressure line 22, see Figure 1, which is connected with the pipe 14, and which enters the casing 3 to form the "coil." This return line is wound about the casings which form the recesses 4—5, and emerges at the top of the casing 3, see Figure 2, and is connected with the pipe 30. This pipe 30 (as part of the low pressure line) is bent to provide either one or a series of coils arranged in the refrigeration chamber 1, and having their axes vertically arranged and herein respectively indicated 31, 32, 33 and 34. The end of the last coil 34 is continuous with pipe 40, see Figure 1, which pipe is connected with the suction side of the compressor, not shown. It will be understood that the pipe 8 is connected with the pressure side of the compressor. The refrigeration operation is so well known that no further remarks are made in regard to it.

In each of the coils 31, 32, 33 and 34 is inserted a cup 36 adapted to receive brine or alcohol as a refrigerating medium. The thermostats to be tested are indicated at 45, and as herein shown, there is one thermostat in each test cup. In addition, each test cup has a thermometer 46 therein, to indicate the temperature at which the particular thermostat opens or closes its contacts during the test period. A single thermometer 46, in only one of the cups, may be used.

This invention is particularly useful in testing that refrigeration control type of thermostat which has a tubular stem containing at one end a suitable refrigerant liquid operating an expansion device, which latter device in turn controls a switch mounted in a casing carried by the opposite end of the stem. In use on the refrigerating machine, the refrigerant-containing portion of the stem is exposed to the temperature of the suction side of the refrigerating line, being generally secured in contact with the line at a point adjacent the refrigerating unit. In such a position, different portions of the thermostatic device are, therefore, exposed to different degrees of temperature, to-wit that of the suction line which is at the lower temperature, and that of the refrigeration chamber which is at a higher temperature. The thermostat operates best after it has taken a temperature which is somewhere between said temperatures. To properly test the thermostat it is, therefore, preferable that the conditions for the test be substantially the same as those of use, and this invention provides for a test under such conditions. A thermometer 38 indicates the temperature of the test chamber 1.

In order that the attendant may know when the contact of the particular thermostat has either opened or closed, electrically operable signaling means is provided and means is also provided by which the signaling means is operated, including circuit wires connectible with the terminals of a thermostat when inserted in and projecting from the test receptacle so as to have its upper portion exposed to the temperature of the chamber and its lower portion exposed to the temperature of the refrigerant liquid in the cup.

To ascertain which thermostat of a plurality has opened or closed its contacts, it is necessary that each have its own signaling means. In the present embodiment, two signaling elements each having different visual characteristics, are provided for each cup or for each thermostat to be tested, and also a single audible signaling means is provided which is operable in conjunction with either of the visible signaling means. In this instance, whenever a thermostat opens or closes its contact as the case may be, an electric bulb is lighted and a bell is rung. However, either an audible or a visible signal may be used.

To properly operate the signals, relays are provided, one for each set of visible signaling means and, therefore, one for each thermostat to be tested. The terminals of a given thermostat are in circuit with the coil of the corresponding relay so that when the thermostatic contacts close or open, the relay is respectively energized or de-energized. The relay controls electrical contacts to properly operate the signals. Four relays are shown, in correspondence to the number of cups or test coils. The relays are respectively indicated 50, 51, 52 and 53. They are of the double throw double pole type. A green light is indicated at 47 and a red light at 48. The bell is indicated at 49. The circuit connections will only be referred to numerically in detail under the heading "Operation".

In the drawings, the machine is set for testing the opening temperature of the thermostats, and represents the condition at the beginning of the test in which all thermostatic contacts are closed and all relays are energized. When any thermostat opens its contacts, the corresponding relay is de-energized and the relay falls out and the red light is flashed and the bell rung.

Each relay is biased to open, and it opens on opening of the test thermostat, at which time the red signal is lighted, and the bell rings. When it closes, during a test, it operates the green signal and the bell to indicate that the test thermostat has closed. There is included a manually operable switch by which either visual signaling element can be operated for signaling simultaneously with the audible signaling element.

*Operation*

Suppose we have a number of thermostats to be tested. Suppose, for example, each thermostat is rated to open at 30 degrees Fahrenheit, and we wish to test to see that it does open at this temperature, we heat it to 50 degrees Fahrenheit, and then cool it until it opens. However, as delivered to the operator, their contacts are ordinarily closed because they have been exposed to ordinary and higher atmospheric temperatures for a sufficient period of time. Therefore, it is not necessary to pre-heat them. Since the contacts are already closed, the operator first tests to ascertain the temperature at which each opens. To do this, it is necessary to cool each sufficiently—in this example to 30 degrees. If the refrigerating apparatus is at a sufficiently low temperature (below 30 degrees), brine or alcohol is placed in the test cup (or cups), the temperature of this liquid being higher (55 degrees or more) than the rated contact-opening temperature of that particular thermostat. After placing the thermostat in the liquid in the cup, its terminals are electrically connected with the corresponding signal control means, in this case the relay. As soon as this connection is closed, the relay will close. Before making the connection, the switch 55 is thrown to the position shown in the drawings to put the bell in circuit with the red light 48. When the connection is made, the thermostat contacts being closed, the relay will be energized, and move to the position shown in the drawings, to energize the green light. The test now begins, the refrigerating unit cooling the brine. When the brine is sufficiently cool, the thermostat opens. The corresponding relay falls out, and contacts are made to simultaneously energize the red signal light and the bell. The attendant now notes the temperature indicated by thermometer 46.

The attachment of the terminals 56—57 of the thermostat 45 energizes the relay through the following circuit: line 60, line 61, relay coil 62, line 63, to terminal 57 of the thermostat, through the thermostat contact (not shown) to the other thermostat terminal 56, thence by conductor 64 to line 66. By closure of the relay, green light 47 is energized through the following circuit: 60, 67, light 47, conductor 68, relay contact 69, conductor 70, conductor 71 to line 66.

When it is desired to have the bell 49 ring, as when the bulb 47 is energized, switch 55 is moved from the position shown to contact with wire 73. The circuit for the bell is then from line 60, line 75, bell 49, line 76, line 79, switch 55, line 73, contact 80, line 81, line 71, to line 66.

As shown in the drawings, on de-energization of the relay (due to opening of the thermostat contacts) the circuit to the red light 48 is made as follows: 60, 67, 48, 83, contact 84, 70, 71 to 66. At the same time the bell circuit is closed through a circuit as follows: 60, 75, bell 49, 76, 79, 55, 90, contact 91, 81, 71 to 66. The circuit arrangement is such that a single bell only is used.

The same thermostat (or thermostats) may now be tested to ascertain its closing temperature. If the thermostat is rated to close at 50 degress and we wish to test to see that it will close at this temperature, we cool the thermostat to say 40 degrees—to open its contacts, and then heat it until the contacts close. The contacts are only opened when the thermostat is sufficiently cold. To do this, therefore, the thermostats must be submitted to a sufficiently low temperature to open the contacts. Inasmuch as they have just opened, all that we now have to do is to operate the refrigerating apparatus to produce less cold and, therefore, to gradually warm the liquid in the test cups. Before starting this operation, we move the switch 55 to the position opposite that shown in the drawings to condition the signal circuits for simultaneously operating the green light and the bell when the relay closes. The refrigerating apparatus is now operated, as in defrosting, to raise the temperature until the thermostat closes its contact, at which time the green light will go on and the bell will ring. The temperature of the thermometer 46 is now noted by the operator.

If the contacts of the thermostats to be tested are not already open, an alternate way to test for closing is to pre-cool the thermostat or thermostats by inserting them in the recess 4 or 5. When this is done, the thermostats may be brought to a temperature which may be lower than the temperature of the liquid in the test cup, and the time is lessened because, although the temperature of the brine in the cup may be comparatively low, it is not necessarily as low as the temperature of the thermostat, after such pre-cooling. However, in any event, to test for closing the temperature of the liquid in the cup must be raised to or above the temperature at which the particular thermostat is rated to close. Having heard the signal, the attendant notes the reading of the thermometer 46 and compares it with the opening temperature reading for the particular thermostat. Of course, the individual signals generally are operated at different times, in correspondence to the differences in the temperatures at which the various thermostats open.

The description thus far has referred to that type of thermostat which is used in refrigerating plants which opens when the temperature is sufficiently low and closes when it is sufficiently high. However, the apparatus is applicable for testing other types of thermostats which, for example, close when the temperature is sufficiently low and open when it is sufficiently high.

Features of the invention include the broad idea of providing means for testing thermostats of the type herein mentioned; the provision of a refrigeration chamber and means therein for testing a thermostat under conditions which simulate those of the natural conditions of use of the instrument; the formation of coils in the low pressure side of the refrigeration line and the use of those coils as testing receptacles; the provisions of visual and audible signaling means; means for selectively operating the signaling means; the use of a plurality of visible signaling means having different visual characteristics respectively used to signal the opening or closing of the thermostat being tested; and generally to all details of construction described or disclosed.

What is claimed is,

1. A device of the class described comprising a refrigeration chamber, liquid holding receptacle in said chamber for receiving a portion of a thermostat to be tested, means by which the liquid in the receptacle, and the air in said chamber, are differentially refrigerated, electrically operable signaling means including circuit elements connectible with the terminals of the thermostat to be tested, when the latter is inserted in and projects from said receptacle, for operating said signal means conformably to the condition of the contacts of said thermostat, and means for indicating the temperature within the receptacle.

2. A device of the class described comprising a refrigeration chamber, refrigerating means in the chamber including a refrigerating unit, means for controlling the unit including a refrigeration pipe line in part within the chamber, an open top liquid-receiving receptacle cooled by a part of the refrigerating pipe line which is in the chamber, electrically operable signaling means having circuit elements electrically connectible with the terminals of a thermostat, inserted in the liquid of the receptacle, for operating said relay conformably to the conditions of either of two contacts of said thermostat, and means for indicating the temperature of the liquid in the cup.

3. A device of the class described comprising a refrigeration chamber, refrigerating means in the chamber including a refrigerating unit, means for controlling the unit, including a refrigeration pipe line, a liquid receptacle cooled by a part of the refrigerating pipe line which is in said chamber, electrically operable signaling means including two visible signaling elements each having a different visual characteristic related respectively to the opening and closing operation of the thermostat, an audible signaling means, means for selectively controlling the signaling elements to operate either visible signaling element simultaneously with the audible signaling means, means electrically connectible with the terminals of a thermostat inserted in the liquid of the receptacle into the refrigeration chamber for operating said selective signal controlling means, and means for indicating the temperature of the liquid in the cup.

4. In a device for testing thermostats, a refrigeration chamber, a refrigeration unit therein, means for controlling the unit including a refrigeration pipe line, a low pressure portion of the line being formed to provide a coil, a test receptacle within the coil, electrically controllable signaling means for indicating opening or closing operation of the thermostat to be tested, and means for controlling said signal means as a result of opening or closing of the contacts of a thermostat placed in the test receptacle.

5. A device of the class described comprising a refrigeration chamber, refrigerating means in the chamber including a refrigerating unit, means for controlling the unit including a refrigeration pipe line, a liquid receptacle associated with the refrigerating pipe line, electrically operable signaling means including two visible signaling elements each having a different visual characteristic, an audible signaling element, a relay and connections by which it controls the signaling elements to selectively operate either visible signaling element, means electrically connectible with the terminals of a thermostat inserted in the liquid of the receptacle for operating said relay conformably to the condition of the contacts of said thermostat, said signal element connections including a switch by which the audible signaling element can be put in circuit with either visual signaling element, and means for indicating the temperature of the liquid in the cup.

6. A device of the class described comprising a refrigeration chamber, refrigerating means therein including a refrigerating unit having a refrigerating pipe line, a portion of said line on the low pressure side and within the chamber being formed to provide a coil, a refrigerant receptacle in said coil for holding a liquid refrigerant, electrically operable signal means including two visible signaling elements each having a different visual characteristic, an audible signaling element, means electrically connectible with the terminals of a thermostat inserted in said liquid refrigerant for operating said signal elements conformably to the condition of the contacts of the thermostat, and means for indicating the temperature of the refrigerant in said receptacle.

7. A device of the class described comprising a refrigeration chamber, refrigerating means therein including a refrigerating unit having a refrigerating pipe line, a portion of said line on the low pressure side and within the chamber being formed to provide a coil, a refrigerant receptacle in said coil, electrically operable signal means including two visible signaling elements each having a different visual characteristic, an audible signaling element, means electrically connectible with the terminals of a thermostat inserted in the refrigerant in said receptacle for selectively operating said signal elements conformably to the condition of the contacts of the thermostat, a switch by which the audible signaling element can be put in circuit with either visual signaling element, and means for indicating the temperature of the refrigerant in the receptacle.

8. A device of the class described comprising a refrigeration chamber, refrigerating means therein including a refrigerating unit having a refrigerating pipe line, a refrigerant-holding receptacle associated with a portion of said line on the low pressure side, electrically operable signal means including visible signaling means and audible signaling means, means electrically connectible with the terminals of a thermostat which is inserted in the refrigerant in said receptacle for operating said signal means conformably to the condition of the contacts of the thermostat, a switch by which the visual and audible signaling means can be put in the same circuit to operate simultaneously, and means for indicating temperature of the refrigerant in the cup.

9. A device for testing the opening and the closing temperature of a thermostat of the switch-operating terminal-carrying type used for controlling refrigeration apparatus comprising, a single refrigeration chamber having therein a cooling unit adapted to receive a thermostat for pre-cooling it, means also in said chamber for receiving a thermostat and testing it after pre-cooling, means for applying refrigeration to said pre-cooling and testing means and chamber, a plurality of electrically operable signaling means for indicating when the thermostat switch opens and closes, means for operating said signal means including circuit connections connectible with terminals of the thermostat after placement for testing, and means visible to an operator for respectively indicating the temperatures of said testing means and chamber.

10. A device for simultaneously testing the opening and the closing temperature of a thermostat of the switch-operating terminal-carrying type used for controlling refrigeration apparatus comprising, a refrigeration chamber having a receptacle therein for holding a non-freezing liquid in which a part of the thermostat to be tested is inserted, means for applying refrigeration to said chamber and to the receptacle, to cool the liquid, a plurality of electrically operable signaling means for indicating when the thermostatic switch opens and when it closes, means for operating said signal means including circuit connections connectible with terminals of a thermostat after placement in said receptacle, and means visible to an operator for indicating the temperature of the liquid of the receptacle.

11. A device for testing the opening and closing temperatures of thermostats of the type used for controlling domestic refrigeration apparatus comprising, a refrigeration chamber including a transparent wall by which inspection can be made of the interior, a thermometer for indicating the temperature within the chamber, refrigerating means for controlling the temperature in the chamber and located therewithin, a holding receptacle for non-freezing liquid for receiving a thermostat to be tested, means by which the temperature of the liquid in the receptacle is controlled by said refrigerating means including coils formed from a single piece of tubing which is a part of the refrigeration apparatus, electrically operable signaling means including circuit elements connectible with the terminals of the thermostat while in the liquid of the holding receptacle for operating the signaling means when the thermostat closes or opens and means visible to an operator for indicating the temperature of the non-freezing liquid.

12. A device for testing the opening and closing temperatures of thermostats of the expansion-bulb-electrical-contact type comprising a refrigeration chamber, means in said chamber adapted to receive the bulb portion of a thermostat in such manner that the contact portion is exposed to the temperature of the chamber, thermometers responsive to respective temperatures and visible to an operator outside of the chamber, means by which the receiving means and the chamber are respectively submitted to different degrees of controlled refrigeration, electrically controlled means including a plurality of signalling devices each device differing in the character of its signal, one device adapted to signal when the contacts of a thermostatic switch being tested open, and the other adapted to signal when the contacts close, and electrical connections by which a thermostatic switch being tested controls signaling, including switches operable for selectively operating the desired signaling means.

DANIEL A. WHITE.
JOHN O. McNAMARA.